United States Patent Office 3,395,183
Patented July 30, 1968

3,395,183
PREPARATION OF 1-OXO-1,2,3,4-TETRA-
HYDRONAPHTHALENE
Donald M. Fenton, Anaheim, Calif., assignor to Union
Oil Company of California, Los Angeles, Calif., a corporation of California
No Drawing. Filed Apr. 20, 1967, Ser. No. 632,170
8 Claims. (Cl. 260—590)

ABSTRACT OF THE DISCLOSURE

The invention relates to the preparation of 1-oxo-1,2,3,4-tetrahydronaphthalene or derivatives thereof by oxidation of 1,2,3,4-tetrahydronaphthalene or derivatives in the presence of cuprous chloride or bromide or a combination of the cuprous halide and carbon monoxide.

---

Oxidation of 1,2,3,4-tetrahydronaphthalene to 1-oxo-1,2,3,4-tetrahydronaphthalene with molecular oxygen has been disclosed, e.g., by Robertson and Waters, J.C.S., 1574–90 (1948). This process conventionally gives a yield of 1-oxo-1,2,3,4-tetrahydronaphthalene of about 48%, with 1-hydroxy-1,2,3,4-tetrahydronaphthalene being the other major product (usually in a yield of about 30%). The 1-oxo-1,2,3,4-tetrahydronaphthalene thus prepared is of value because it can be converted to alpha naphthol, e.g., by dehydrogenation with palladium on charcoal. Alpha naphthol is valuable for a variety of uses such as dyes, synthetic perfumes and synthesis of other organic compounds. This prior art process, however, has the disadvantage of giving a relatively low yield of 1-oxo-1,2,3,4-tetrahydronaphthalene, as mentioned above.

It has now been found that the yield of 1-oxo-1,2,3,4-tetrahydronaphthalene, as compared to 1-hydroxy-1,2,3,4-tetrahydronaphthalene, i.e., the selectivity of the reaction for 1-oxo-1,2,3,4-tetrahydronaphthalene, may be substantially improved by carrying out the reaction in the presence of a catalytic amount of either cuprous chloride or cuprous bromide or a mixture of the two. It has also been found that the selectivity for 1-oxo-1,2,3,4-tetrahydronaphthalene may be still further improved by inclusion of a catalytic amount of carbon monoxide in combination with the cuprous halide.

Although the invention is particularly applicable to oxidation of 1,2,3,4-tetrahydronaphthalene, it may also be used for oxidation of derivatives of 1,2,3,4-tetrahydronaphthalene. Thus, the reactant may be represented by the following formula:

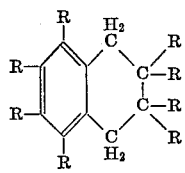

where R represents hydrogen or the same or different alkyl, aryl, alkaryl, aralkyl or cycloalkyl radicals having from 1 to about 12 carbon atoms.

The reaction is carried out in the liquid phase at a temperature of from about 50° to 150° C., preferably from about 70° to 110° C., and a pressure of from atmospheric to about 1000 p.s.i.g. Temperature and pressure should be such as to maintain the 1,2,3,4-tetrahydronaphthalene compound in the liquid state and provide a suitable reaction rate. In addition, the temperature of the reaction should be kept below about 120° C. for best yield and selectivity. Generally, atmospheric pressure gives satisfactory yields and reaction rates. Optimum values of temperature and pressure will vary according to the nature, purity and amounts of the reactants, time of reaction, etc. Time of the reaction may vary from about ½ hour to 72 hours with optimum time depending on the above-discussed variables. Separation of the 1-oxo-1,2,3,4-tetrahydronaphthalene from the reaction mixture is accomplished by conventional procedures, e.g., by fractional distillation at atmospheric or reduced pressure (see page 1577 of above-cited Robertson and Waters article), or by chemically reacting in the presence of the other reaction materials to give derivatives, such as the oxime.

Air is preferably the source of the molecular oxygen; however, pure oxygen may be used and the pressure is then kept near atmospheric. An inert carrier such as nitrogen or helium may be employed for the air or oxygen. The air or oxygen is sparged through the reaction mixture or added in increments until the desired conversion of the 1,2,3,4-tetrahydronaphthalene is achieved.

Amounts of the catalyst will vary from about 0.001 to 20 wt. percent, based on the weight of 1,2,3,4-tetrahydronaphthalene. When carbon monoxide is employed as a cocatalyst it is supplied to the reaction vessel along with or preceding the oxygen, the ratio of carbon monoxide to oxygen or air being from about 0.01 to 100.

Any suitable reaction vessel, such as a flask or an autoclave (for large scale reactions) having means for stirring, introduction of gases and removal of water (e.g., by means of a condenser) formed during reaction may be used for the reaction. The 1,2,3,4-tetrahydronaphthalene may be pure or may be the crude material derived from refinery operations. Generally the 1,2,3,4-tetrahydronaphthalene and copper-containing catalyst are first added to the autoclave and the mixture is agitated by the addition of the oxygen-containing gas, as well as by stirring. These procedural steps may, however, be varied considerably without altering the essential steps of the process as set forth in the claims below.

The following examples will serve to more specifically describe the invention and its advantages.

EXAMPLES 1 to 4

400 ml. of 1,2,3,4-tetrahydronaphthalene and 10 grams of cuprous chloride (if used) were added to a 1-liter flask provided with mechanical stirring. Air and carbon monoxide (if used) were bubbled vigorously through the mixture while the temperature was raised to the value given in Table 1. This temperature and the addition of the gases was maintained for the duration of the reaction time of 48 hours. The yield of products and the percent of 1-oxo-1,2,3,4-tetrahydronaphthalene and 1-hydroxy-1,2,3,4-tetrahydronaphthalene in the products are also given in Table 1. These were determined by infrared spectroscopy, based on known mixtures as standards. It will be seen from the data in Table 1 that the addition of cuprous chloride markedly increases the selectivity of the reaction to 1-oxo-1,2,3,4-tetrahydronaphthalene and that when carbon monoxide is added a further increase in selectivity is achieved.

TABLE 1

| Ex. | Temp., °C. | Time, hrs. | Yield, grams | Percent 1-oxo-1,2,3,4-tetrahydronaphthalene | Percent 1-hydroxy-1,2,3,4-tetrahydronaphthalene | CuCl, g. | Volume Percent of CO Added |
|---|---|---|---|---|---|---|---|
| 1 | 80 | 48 | 169 | 49 | 20 | | |
| 2 | 90 | 48 | 281 | 68 | 21 | 10 | |
| 3 | 90 | 48 | 112 | 81 | 14 | 10 | 50 |
| 4 | 120 | 24 | 120 | 53 | 130 | 10 | 50 |

I claim:
1. In the method of preparing 1-oxo-1,2,3,4-tetrahydronaphthalene or derivatives thereof by oxidation of 1,2,3,4-tetrahydronaphthalene or derivatives represented by the formula

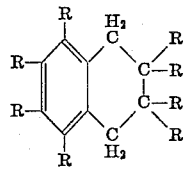

in which R is hydrogen or the same or different alkyl, aryl, alkaryl, aralkyl or cycloalkyl radicals having from 1 to about 12 carbon atoms, with molecular oxygen to form a mixture of reactants comprising 1-oxo-1,2,3,4-tetrahydronaphthalene or derivatives and 1-hydroxy-1,2,3,4-tetrahydronaphthalene or derivatives, the improvement comprising carrying out the oxidation in the presence of a catalytic amount of cuprous chloride or cuprous bromide to increase the proportion of 1-oxo-1,2,3,4-tetrahydronaphthalene or derivative relative to that of 1-hydroxy-1,2,3,4-tetrahydronaphthalene or derivative in the product.

2. The method of claim 1 in which the catalyst is cuprous chloride.

3. The method of claim 1 in which the source of the molecular oxygen is air.

4. The method of claim 1 in which the reaction temperature is from about 50° to 150° C. and the pressure is from about atmospheric to about 1000 p.s.i.g.

5. The method of claim 1 which additionally includes the use of a catalytic amount of carbon monoxide in combination with the cuprous chloride or bromide to further increase the proportion of 1-oxo-1,2,3,4-tetrahydronaphthalene or derivative in the product.

6. The method of claim 5 in which the cuprous catalyst is cuprous chloride.

7. The method of claim 5 in which the source of the molecular oxygen is air.

8. The method of claim 5 in which the reaction temperature is from about 50° to 150° C. and the pressure is from about atmospheric to about 1000 p.s.i.g.

References Cited

UNITED STATES PATENTS

| 2,451,485 | 10/1948 | Hearne et al. | 260—597 |
| 2,486,842 | 11/1949 | Hearne et al. | 260—597 |
| 2,879,300 | 3/1959 | Cheney et al. | 260—597 |

FOREIGN PATENTS

| 520,290 | 3/1931 | Germany. |

DANIEL D. HORWITZ, *Primary Examiner.*